Sept. 28, 1954     A. E. SCHMIDLIN     2,690,292
UNLOADING SYSTEM FOR COMPRESSORS
Filed May 17, 1950.
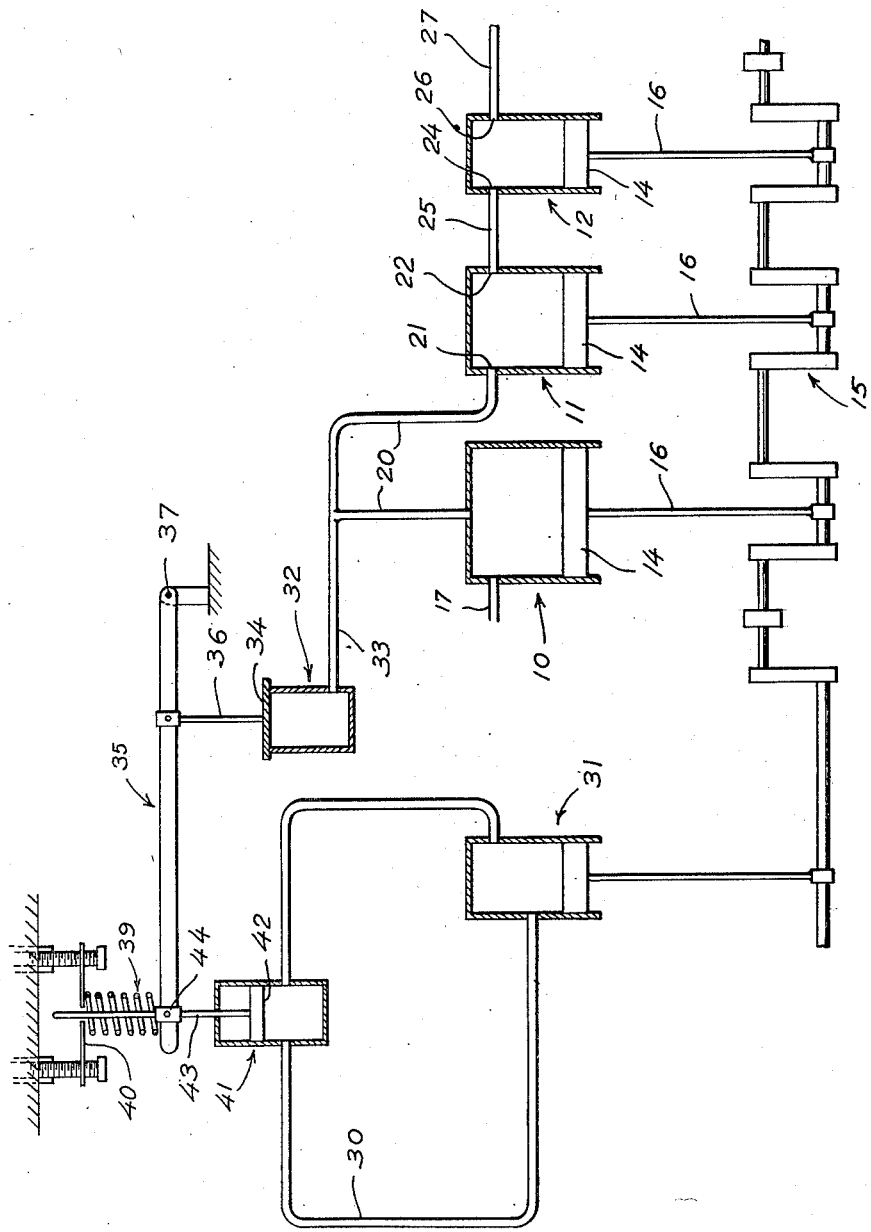
INVENTOR
*ALBERTUS ERNEST SCHMIDLIN*
BY
ATTORNEY Patented Sept. 28, 1954

2,690,292

UNITED STATES PATENT OFFICE 2,690,292

UNLOADING SYSTEM FOR COMPRESSORS

Albertus Ernest Schmidlin, Caldwell, N. J., assignor to Specialties Development Corporation, Belleville, N. J., a corporation of New Jersey Application May 17, 1950, Serial No. 162,432

4 Claims. (Cl. 230—30)

The present invention relates to compressors and the like, and, more particularly, relates to an unloading or flow governing system for air compressors of the type which are driven by an engine or motor operated over a wide range of speeds.

Air compressors and the like on airplanes, power boats and other craft and vehicles usually are driven by the main power plant, that is, the engine or motor for propelling the craft or vehicle. Since it is desirable that a supply of compressed air is available at all times while the craft or vehicle is in operation, the compressor is operated continuously. However, in most instances, the engine or motor is operated at a variable speed over a wide range whereby the compressor will likewise be operated over a wide range of speeds. Thus, to provide for a sufficient supply of compressed air, the compressor must be designed to meet such requirement while being operated at a relatively low speed. Consequently, when the compressor is operated at higher speeds, the compressed air output thereof may be greater than required.

It is of course a simple matter to relieve the excessive pressure developing from the high compressed air output which would result from the mode of operation above described, when the compressor is operated at relatively high speeds, by the employment of a pressure relief valve, with which compressed air storage containers are usually provided anyway. However, where weights and space limitations are important, as for example in apparatus designed for use on aircraft, it is desirable to design the compressor to handle an optimum volume of air, without excess capacity in the compressor cooling system; and in this situation the handling of an excessive volume of air by the compressor at high engine speeds would result in serious overheating of the compressor.

Furthermore, the volume of air handled by the compressor may vary considerably even for a given engine speed, depending on whether air to be compressed is drawn into the compressor at normal atmospheric pressure or at subnormal atmospheric pressure (as at higher altitudes) or whether supercharged air is delivered to the air intake of the compressor.

Accordingly, an object of the present invention is to provide a simple and practical unloading or flow governing system for air compressors, whereby the compressor will deliver a desired volume of air at a desired pressure despite relatively large variations in the speed of operation of the compressor and despite relatively large variations in the pressure at which air is delivered to the air intake of the compressor.

Another object is to provide such an unloading or flow governing system which is responsive to the speed at which the compressor is operated and to the pressure of the air in the compressor itself or in the line delivering air from one stage of compression to another.

Another object is to provide such an unloading or flow governing system which is light in weight and occupies a minimum of space.

A further object is to provide such an unloading or flow governing system which is adaptable for multi-stage compressors.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are accomplished by providing, an air compressor or the like; a fluid circulating system, such as a lubricating system for the compressor including a pump for circulating the lubricant; means for driving the compressor and the pump; an unloading valve for the compressor; and means responsive to the pressure of the lubricant for controlling the operation of the unloading valve.

In an embodiment of the invention about to be described, the valve member of the unloading valve is connected between the ends of a pivotally mounted lever, and a spring is associated with the lever for causing the same to urge the valve member into valve closing position. A piston operating in a cylinder disposed in the lubricating system of the compressor is also connected to the lever on the side thereof opposite to the spring, whereby the unloading valve is influenced by the pressure of the lubricant as it flows through the piston cylinder, the pressure of the lubricant in turn being made to vary with the speed of operation of the compressor through a pump in the lubricating system connected to the compressor driving means. Thus, the opening and closing of the unloading valve is controlled by the speed of operation of the compressor and the pressure of the compressed air produced in the compressor.

The present invention further contemplates that the unloading system be used in connection with multi-stage compressors, the unloading valve being connected between successive stages, preferably, between the first and second stages. This minimizes the volume of air to be handled by the second and subsequent stages, and eliminates the necessity of relatively large inter-coolers between stages which would otherwise be required to handle the entire volume of air supplied by the first stage.

A preferred embodiment of the invention has been chosen for purposes of illustration and description, and is shown in the accompanying drawing, forming a part of the specification, wherein the single figure is a schematic view of an unloading system for air compressors.

Referring to the drawing in detail, there is shown an air compressor, which, by way of example, may be an in-line-multi-stage compressor comprising first, second and third stage cylinders 10, 11 and 12, a piston 14 in each cylinder, and a drive shaft such as a crank shaft 15 connected to the pistons by piston rods 16.

The first stage cylinder 10 has an air inlet 17, and an outlet connected by a conduit 20 to the inlet 21 of the second stage cylinder 11. The second stage cylinder has an outlet 22 connected to the inlet 24 of the third stage cylinder 12 by a conduit 25, and the outlet 26 of the third stage cylinder is connected to a delivery pipe 27 for conducting the compressed air to a storage tank or to apparatus for utilizing the air (not shown). The inlets and outlets of the cylinders 10, 11 and 12 are equipped with conventional valving which is well known and, for the sake of simplicity, need not be illustrated herein.

The lubricating system for the compressor is illustrated diagrammatically by a lubricant circulating conduit 30 having a pump 31 connected therein. The pump is driven in predetermined relation with the compressor, for example by the crankshaft 15, although it will be understood that the pump could be otherwise in driven connection with the drive means of the compressor, whereby the lubricant is pumped in relation to the speed at which the compressor is operated.

As shown in the drawing, an air relief or unloading valve 32, which has an outlet normally closed by a valve member 34, is connected by a conduit 33 to the conduit 20 between the first and second stage cylinders. The valve member is connected between the ends of a lever 35 by a link 36, the lever being pivotally mounted at 37.

A spring 39 is positioned at the free end of the lever 35 to urge the lever in a counterclockwise direction (as viewed in the drawing), whereby the valve member 34 is normally retained in outlet closing position under the influence of the spring acting on the lever.

The unloading or flow governing valve 34 is controlled in response to the speed at which the compressor is operated by a lubricant pressure or flow sensing device which comprises a cylinder 41 connected in the lubricating circuit conduit 30, a pressure or flow responsive piston 42 in the cylinder 41, and a stem 43 connecting the piston and the free end of the lever 35 at 44. The valve member is also adapted to be unseated when the pressure of the compressed air in the conduit 20 is of a value, either alone or in conjunction with the force exerted by the piston 42, to overcome the force exerted by the spring 39. The spring has one end in engagement with the lever 35 and has its other end in engagement with a stop 40, which may be adjustable to vary the force exerted by the spring on the lever.

In this manner, when the compressor is operated at a high speed, the pump 31 circulates the lubricant at a high rate whereby pressure builds up in the cylinder 41. Such pressure causes a force to be exerted on the piston 42 which acts through the stem 43 to overcome the effective force of the spring 39. Thus, when the sum of the force applied to the piston 42 and the force of the compressed air tending to unseat the unloading valve member 34 overcomes the force of the spring, the lever is moved in a clockwise direction (as viewed) to effect unseating of the valve member 34. Unloading of the compressor can thereby be effected by either or both of these forces acting in opposition to the spring.

From the foregoing it will be seen that the compressor will deliver a desired volume of free air at a desired pressure; the volume of free air delivered by the compressor being a function of the intake pressure of the second stage, the fixed displacement volume of the second stage and the speed of the crank shaft. As the invention provides means for reducing the intake pressure of the second stage substantially proportionately to the increase in the speed of the crank shaft driving the compressor, the volume of free air delivered is substantially constant and at a desired pressure.

The means for reducing the intake pressure of the second stage includes the valve member 34 which, in the event of increased speed of the compressor, is unseated in the manner previously described whereby to effect unloading of the compressor. This reduction in the intake pressure of the second stage is compensated for by the increased number of strokes of the piston 14 of the first stage due to the increased speed of the crank shaft, thereby maintaining delivery of a substantially constant volume of free air at a desired pressure despite variations in the speed of operation of the compressor.

The delivery of a substantially constant volume of free air at a desired pressure is also maintained despite variations in the pressure at which air is delivered to the air intake 17. When the pressure of the intake air, either alone or in conjunction with the force exerted by the piston 42, is of a value to overcome the force exerted by the spring 39, the valve member 34 will be unseated whereby to unload the excessive pressure and maintain the desired pressure and a delivery of a substantially constant volume of free air.

It will be seen, therefore, that by reason of the air outlet conduits 20, 33 being disposed between the first stage and second stage cylinders, the excess air handled by the first stage is allowed to be blown off before reaching the second stage cylinder, whether the excess is due to an increase in speed of the compressor or an increase of the intake air pressure.

While the unloading system has been described in connection with a multi-stage compressor, it will be appreciated that it also is adaptable for single stage compressor by connecting the unloading valve in the delivery pipe of the compressor.

From the foregoing description, it will be seen that the present invention provides a simple and practical unloading system for air compressors or the like while under the control of either or both the pressure of the compressed air produced and the speed of the compressor. This unloading system simplifies the design of the compressor and enables the weight and size thereof to be greatly reduced over other compressors of equivalent capacity.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In combination, an air compressor, a fluid circulating system including a pump for moving the fluid through said system, common drive means for said compressor and said pump, an unloading valve for said compressor including an air venting valve member, means including a spring for urging said valve member into valve closing position, and means solely and directly responsive to the pressure of fluid in said system for varying the effectiveness of said spring, said last mentioned means including a cylinder and a piston in said cylinder connected with said spring.

2. In combination, an air compressor; a fluid circulating system including a pump for moving the fluid through said system under pressure, a cylinder through which fluid is circulated, and a piston in said cylinder responsive to the pressure of fluid; means for driving said compressor and said pump in unison; an unloading valve for said compressor including an air venting valve member; a pivotally mounted lever connected between the ends thereof to said valve member; a spring arranged for urging said lever in a direction to retain said valve member in valve closing relation; and means connecting said piston and said lever to thereby vary the effectiveness of said spring in response to the pressure of fluid in said cylinder.

3. In combination, an air compressor; a lubricating system for said compressor including a pump, a cylinder through which lubricant is circulated under pressure by said pump, and a piston in said cylinder responsive to the pressure of lubricant in the cylinder; means for driving said compressor and said pump in unison; an unloading valve for said compressor including an air venting valve member; a pivotally mounted lever connected between its ends to said valve member; a spring arranged for urging said lever in a direction to retain said valve member in valve closing relation; and means connecting said piston and said lever to thereby vary the effectiveness of said spring in response to the pressure of lubricant in said cylinder.

4. In combination, a multi-stage air compressor including a crank shaft, a lubricating system for said compressor including a pump driven by said crank shaft, a cylinder through which lubricant is circulated under pressure by said pump, a piston in said cylinder; air inlet means for the first stage; air venting means disposed between the first and second stages including a flow governing valve member, a pivotally mounted lever connected between its ends to said valve member, a spring for urging said valve member in a direction to retain the same in valve closing relation, and means connecting said piston and said lever to thereby effect the opening of said valve member in opposition to the force of said spring in response to the pressure of the lubricant in said system.

References Cited in the file of this patent

UNITED STATES PATENTS

| Number | Name | Date |
|---|---|---|
| 1,602,791 | Wineman | Oct. 12, 1926 |
| 1,910,000 | Buehler | May 23, 1933 |
| 1,911,105 | Buehler | May 23, 1933 |
| 2,047,489 | Pfeifer | July 14, 1936 |
| 2,110,720 | Crittendon | Mar. 8, 1938 |
| 2,115,546 | Aikman | Apr. 26, 1938 |
| 2,185,473 | Neeson | Jan. 2, 1940 |
| 2,274,337 | Ritter | Feb. 24, 1942 |
| 2,404,324 | Staley | July 16, 1946 |